Patented Aug. 15, 1933

1,923,003

UNITED STATES PATENT OFFICE 1,923,003

ZIRCONIUM REFRACTORIES

John D. Morgan, South Orange, N. J., assignor to Doherty Research Company, New York, N. Y., a Corporation of Delaware No Drawing. Application June 5, 1930
Serial No. 459,427

5 Claims. (Cl. 23—110)

The present invention relates to bonded refractories and more particularly to zirconium refractories.

The zirconium refractories possess valuable characteristics which are becoming more or less widely known. Zirconia and zircon are the better known zirconium compounds which have been used in refractories. Refractories of zirconia and zircon are highly resistant to elevated temperatures and to thermal shock. However, they have certain drawbacks, among which is the fact that zirconia shrinks progressively when heated to high temperatures.

Zircon does not shrink in use after having been fired at a high temperature, but often shrinks during the firing so that it is difficult to manufacture articles of zircon of predetermined size. Furthermore, such of the native grains as are of material size often contain planes of cleavage which weaken the grains and the articles made therefrom. Moreover, it has been found difficult to obtain the desired degree of density in engine liners and similar articles made from zircon grains, a fact due in part to natural porosity of some of the grains.

The present invention is based upon the discovery that there is a definite zirconium compound having substantially the composition indicated by the formula $7ZrO_2.2SiO_2$ which, when broken to form an aggregate, is capable of being bonded into refractory articles free from the above mentioned objections.

According to the first and preferred method native zircon is melted in an electric furnace in which condition it tends to give off silica fumes. If the zircon is maintained in molten condition for a few minutes, or over, the composition of the fused mass upon cooling will be found to be approximately $7ZrO_2.2SiO_2$.

A second method of forming $7ZrO_2.2SiO_2$ is to melt zirconia and zircon together in the proportions to form the desired compound. In this method, the composition of the zircon must be investigated, or enough zircon used to insure at least enough silica to give the proportions stated. An excess of silica in the zircon taken initially may be sublimed off in the furnace by maintaining the charge of molten condition, so that the composition of the compound formed is not affected by an initial excess of silica.

A third method of making the compound $7ZrO_2.2SiO_2$ is to melt together zirconia ($ZrO_2$) and silica ($SiO_2$). An excess of silica is provided initially to allow for some which is always volatilized during the fusion. Volatilization of the silica may be minimized by using large particles or lumps of silica and finely divided zirconia.

In each of the threee methods above described of making the compound $7ZrO_2.2SiO_2$, assuming an excess of silica in the original charge, the formation of the compound having the desired composition or formula is indicated when silica ceases to volatilize or sublime off from the molten mass.

In case only approximately the theoretical amount of silica is present in the original batch, it is difficult to determine the completion of the chemical reaction by observing the volatilization of its silica and, in this case, the formation of the desired compound can be checked by analyzing the sample taken from the furnace.

It will be noted that the compound $7ZrO_2.2SiO_2$ is chemically more stable than zircon and that it is stable at its melting point, a temperature believed to be approximately 4000° F. It will be understood however that measurements of temperatures in the neighborhood of 4000° F. are somewhat difficult in the absence of highly refined apparatus.

A temperature of approximately 4000° F. appears to be necessary for the formation of the compound $7ZrO_2.2SiO_2$ in either of the ways described above.

The compound $7ZrO_2.2SiO_2$ crushes when cold to splintery particles which give bonded articles made therefrom maximum resistance to tensile and compressive stresses. The particles themselves may be seen under the microscope to be of a dendritic structure such as is possessed by some metals. This structure being very dense renders the particles substantially non-porous, the porosity being must less than that of native zircon grains and of the order of that of gray cast iron.

The particles may be bonded to form an engine liner or other article having a low porosity and being therefore particularly desirable for use in connection with articles intended to contain or convey highly compressed gases, for instance, an engine liner of a bonded aggregate of crushed $7ZrO_2.2SiO_2$ is substantially non-porous and therefore does not absorb the gaseous working fluid even when the same is under high pressures in the engine. The article moreover may be substantially non-shrinking during firing, the term "non-shrinking" being used to define a degree of contraction not over .025 inch to 1 ft. of length when the temperature is varied from zero to 1000° F. Articles formed of the crushed compound have a close texture and take a fine polish on grinding giving the articles a further desirable property for use as cylinder linings and the like. They have a low thermal conductivity but a high resistance to thermal shock withstanding repeated immersion in cold water after heating to 2000° F.

The articles also have high elasticity returning to their original dimensions without fracture or permanent deformation. They possess a high mechanical strength at temperatures from 1500°

F. to 2500° F. the same being approximately equal to that of cast iron at ordinary temperatures. The articles may therefore be subjected simultaneously to high temperatures and high pressures without injury at 2700° F. The resistance to compression is approximately 200 lbs. per square inch.

Having thus described the invention what is claimed as new is:

1. The compound $7ZrO_2.2SiO_2$.

2. A refractory product consisting substantially of a bonded aggregate including particles having the composition approximately $7ZrO_2.2SiO_2$.

3. The method of making the compound $7ZrO_2.2SiO_2$ which consists in melting zircon and maintaining the temperature above the fusion point until silica ceases to sublime off the melt.

4. The method of forming the compound $7ZrO_2.2SiO_2$ which consists in melting a mixture of zircon and zirconia containing at least as much silica as is required to yield the said compound and volatilizing off any excess silica in the mixture.

5. The method of forming the compound $7ZrO_2.2SiO_2$ which consists in melting a mixture of zirconia and silica in the proportions to form the desired compound.

JOHN D. MORGAN.